United States Patent
Kaoku et al.

(10) Patent No.: US 7,886,619 B2
(45) Date of Patent: Feb. 15, 2011

(54) TORQUE DETECTING APPARATUS AND MANUFACTURING METHOD OF SAME

(75) Inventors: Takashi Kaoku, Yamatokoriyama (JP); Norio Nakatani, Nabari (JP); Taisuke Tujimoto, Kashihara (JP); Akio Osuka, Kashihara (JP); Keizo Arita, Yamatokoriyama (JP); Noriyuki Yahata, Okazaki (JP); Naoki Nakane, Toyota (JP)

(73) Assignees: JTEKT Corporation, Osaka-shi (JP); Denso Corporation, Kariya-shi (JP)

( * ) Notice: Subject to any disclaimer, the term of this patent is extended or adjusted under 35 U.S.C. 154(b) by 0 days.

(21) Appl. No.: 11/702,654

(22) Filed: Feb. 6, 2007

(65) Prior Publication Data

US 2007/0180905 A1    Aug. 9, 2007

(30) Foreign Application Priority Data

Feb. 7, 2006    (JP) .............................. 2006-030221

(51) Int. Cl.
    *G01L 3/00* (2006.01)
(52) U.S. Cl. ................................. 73/862.331
(58) Field of Classification Search .................
                                73/862.331–862.338, 862.391
    See application file for complete search history.

(56) References Cited

U.S. PATENT DOCUMENTS

| 7,089,809 | B2 * | 8/2006 | Nakane et al. | 73/862.331 |
| 7,287,440 | B1 * | 10/2007 | Maehara | 73/862.322 |
| 7,293,472 | B2 * | 11/2007 | Tokumoto et al. | 73/862.331 |
| 2005/0223820 | A1 | 10/2005 | Murakami et al. | |
| 2008/0028870 | A1 | 2/2008 | Tokumoto et al. | |

FOREIGN PATENT DOCUMENTS

| EP | 1 584 908 A2 | 10/2005 | |
| JP | 11-125353 A | 5/1999 | |
| JP | 2005-300267 A | 10/2005 | |
| JP | 2005-345284 A | 12/2005 | |
| JP | 2006067355 | * 3/2006 | ............ 73/862.322 |
| JP | 2007-240496 | 9/2007 | |

\* cited by examiner

*Primary Examiner*—Lisa M Caputo
*Assistant Examiner*—Octavia Davis
(74) *Attorney, Agent, or Firm*—Birch, Stewart, Kolasch & Birch, LLP

(57) ABSTRACT

A torque detecting apparatus includes two magnetism collecting rings cylindrical portions enclosing a magnetic circuit forming member provided on a rotating body and a magnetism sensitive device disposed between the protruding pieces protruding from parts of the cylindrical portions in an radially outward direction of the cylindrical portions. It includes a regulating body for regulating a relative position between the magnetism sensitive device and the protruding pieces respectively. This regulating body includes two inserting recesses into which each of protruding pieces is inserted respectively, each recess having a prismatic shape. It also has a connecting part connecting inner edges of apertures of the inserting recesses to each other. It also has a holding part holding the magnetism sensitive device between the inserting recesses.

9 Claims, 9 Drawing Sheets

US 7,886,619 B2

TORQUE DETECTING APPARATUS AND MANUFACTURING METHOD OF SAME

CROSS-REFERENCE OF RELATED APPLICATION

This non-provisional application claims priority under 35 U.S.C. §119(a) on Patent Application No. 2006-030221 in Japan on Feb. 7, 2006, the entire contents of which are hereby incorporated by reference.

BACKGROUND OF THE INVENTION

The present invention relates to a torque detecting apparatus for detecting torque applied to a rotating body and a manufacturing method of the same.

A torque detecting apparatus is described in Japanese Patent Application Laid-Open No. 2005-300267. In the torque detecting apparatus described in the Japanese Patent Application Laid-Open No. 2005-300267, a magnetic circuit forming member provided on a rotating body which has an input shaft and output shaft connected to each other via a torsion bar is enclosed by cylindrical portions disposed separately from each other in a axial direction of the input shaft, and there is provided protruding pieces projected on parts of the cylindrical portions. There are also provided two magnetism collecting rings concentrating magnetic flux which penetrates the magnetic circuit forming member, a magnetism sensitive device arranged between the protruding pieces, and a detection circuit board connected to the magnetism sensitive device.

The magnetic circuit forming member comprises a permanent magnet provided on one of the input shaft and output shaft and a magnetic ring provided on the other. It is configured to allow magnetism between the permanent magnet and the magnetic ring to vary in accordance with a rotation amount and a rotation direction thereof by relative rotation of the permanent magnet and the magnetic ring.

The magnetism collecting ring is configured to concentrate magnetic flux in the magnetic ring into the protruding piece. The magnetic sensitive device consists of a Hall element allowed to change an electric property (resistance) by action of a magnetic field. It is configured to change a detecting signal, i. e. detected torque, in accordance with a change of magnetism between the protruding pieces by the relative rotation.

The torque detecting apparatus thus configured is mounted on an electric power steering apparatus for a vehicle. The electric power steering apparatus comprises the input shaft connected to a steering wheel, a housing accommodating the input shaft to be supported, an electric motor connected to the output shaft through a decelerating mechanism, a controller consisting of a microprocessor connected to a driving circuit of the electric motor and a detector. It is configured to allow the detector to detect the rotation torque exerted to the input shaft by steering of the steering wheel based on torsion on a torsion bar, and is configured to control the electric motor to drive based on the detected torque.

FIG. 1 is a sectional view of a configuration of a torque detecting apparatus according to the prior art. The torque detecting apparatus configured as in the Japanese Patent Application Laid-Open No. 2005-300267 includes a detecting circuit board 101 connected to a magnetism sensitive device 100. After molding of the magnetism sensitive device 100 and a connecting part connecting the magnetism sensitive device 100 to the detecting circuit board 101 with a synthetic resin material, the magnetism sensitive device 100 of this molded part and the two magnetism collecting rings 102, 102 are molded with the synthetic resin material. This molding is performed as follows: disposing the two magnetism collecting rings 102, 102 in a cavity of a molding die, disposing the magnetism sensitive device 100 of the molded part between the protruding pieces 103, 103 of the two magnetism collecting rings 102, 102, and then filling the cavity with the molten synthetic resin material.

SUMMERY OF THE INVENTION

However, in the torque detecting apparatus wherein the magnetism sensitive device 100 and the magnetism collecting rings 102, 102 are molded as in the Japanese Patent Application Laid-Open No. 2005-300267, when molding in the cavity, a position of the magnetism sensitive device 100 relative to the protruding pieces 103, 103 tends to deviate by a molding pressure. Such as this position deviation can affect a detecting property of the magnetism sensitive device 100 since a distance between the protruding pieces 103, 103 of the two magnetism collecting rings 102, 102 can vary. Thus the detecting properties deviate from others among a plurality of the torque detecting apparatuses, and improvements have been desired.

The present invention is achieved in consideration of the above-mentioned circumstances. A chief object is to provide a torque detecting apparatus and manufacturing method of the same, wherein they can reduce factors which affect a detecting property of a magnetism sensitive device molded along with magnetism collecting rings with synthetic resin, and can reduce deviation of the detecting properties among a plurality of the torque detecting apparatuses.

A torque detecting apparatus according to a first aspect of the present invention, comprising: two magnetism collecting rings, for concentrating a magnetic flux passing through a magnetic circuit forming member, including: cylindrical portions enclosing the magnetic circuit forming member provided on a rotating body to which torque is exerted; and protruding pieces protruding from parts of the cylindrical portions in an radially outward direction of the cylindrical portions; and a magnetism sensitive device, disposed between the protruding pieces, wherein the torque exerted on the rotating body is detected based on magnetism sensed by the magnetism sensitive device, and wherein the torque detecting apparatus further includes a regulating body for regulating relative locations between the magnetism sensitive device and the respective protruding pieces.

A torque detecting apparatus according to a second aspect of the present invention, wherein the regulating body has two inserting recesses into which the protruding pieces insert respectively, and the magnetism sensitive device fits between the inserting recesses.

A manufacturing method according to a third aspect of the present invention for a torque detecting apparatus according to the second aspect of the present invention, the method including steps of fitting the magnetism sensitive device between the inserting recesses of the regulating body; inserting the protruding pieces of the magnetism collecting rings into the respective inserting recesses; and molding the magnetism collecting rings and regulating body with a synthetic resin material.

In the first aspect of the present invention, because of regulating the relative positions between each of the protruding pieces of respective two magnetism collecting rings and the magnetism sensitive device by the regulating body, the magnetism sensitive device and magnetism collecting rings can be molded with molten synthetic resin in the state that this relative positions are regulated. Thus, when molding, such as deviation of the position of the magnetism sensitive device to the protruding pieces and changes of the distance between the protruding pieces of the two magnetism collecting rings due to the molding pressure of the molten synthetic resin material can be prevented from suffering from. Factors affecting detecting properties of the magnetism sensitive device can be diminished. Deviation in the detecting properties among a plurality of the torque detecting apparatus can be diminished.

In the second aspect of the present invention, the regulating body has the two inserting recesses into which the protruding pieces insert respectively. The magnetism sensitive device fits between the inserting recesses. The position of the magnetism sensitive device to the protruding pieces and the distance between the protruding pieces can precisely be maintained. Thus, such as the deviation of the position of the magnetism sensitive device toward the protruding pieces and the changes of the distance between the protruding pieces of the two magnetism collecting rings can readily be prevented from suffering from. Therefore, costs can reduce.

In the third aspect of the present invention, in the steps of fitting and inserting, because of regulating the relative positions between each of the protruding pieces of respective two magnetism collecting rings and the magnetism sensitive device by the regulating body, the magnetism sensitive device and magnetism collecting rings can be molded with molten synthetic resin in the state that this relative positions are regulated. Such as deviation of the position of the magnetism sensitive device toward the protruding pieces and changes of the distance between the protruding pieces of the two magnetism collecting rings by the molding pressure of the molten synthetic resin material be prevented from suffering from. Therefore, the torque detecting apparatus can readily be produced, wherein the deviation in the detecting properties among a plurality of the torque detecting apparatuses can be diminished.

The above and further objects and features of the invention will more fully be apparent from the following detailed description with accompanying drawings.

DETAILED DESCRIPTION OF THE INVENTION

Figure 1:
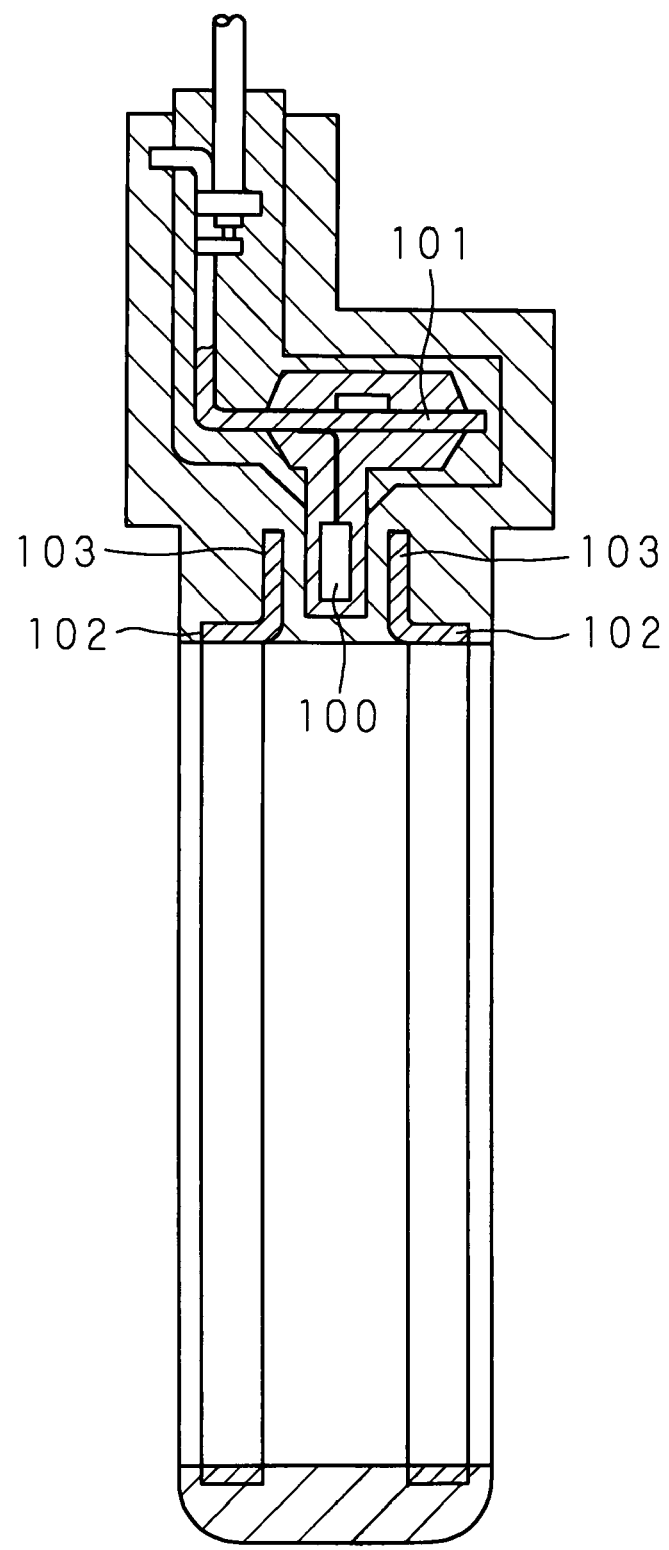
FIG. 1 is a sectional view showing a configuration of a torque detecting apparatus according to the prior art.
Figure 2:
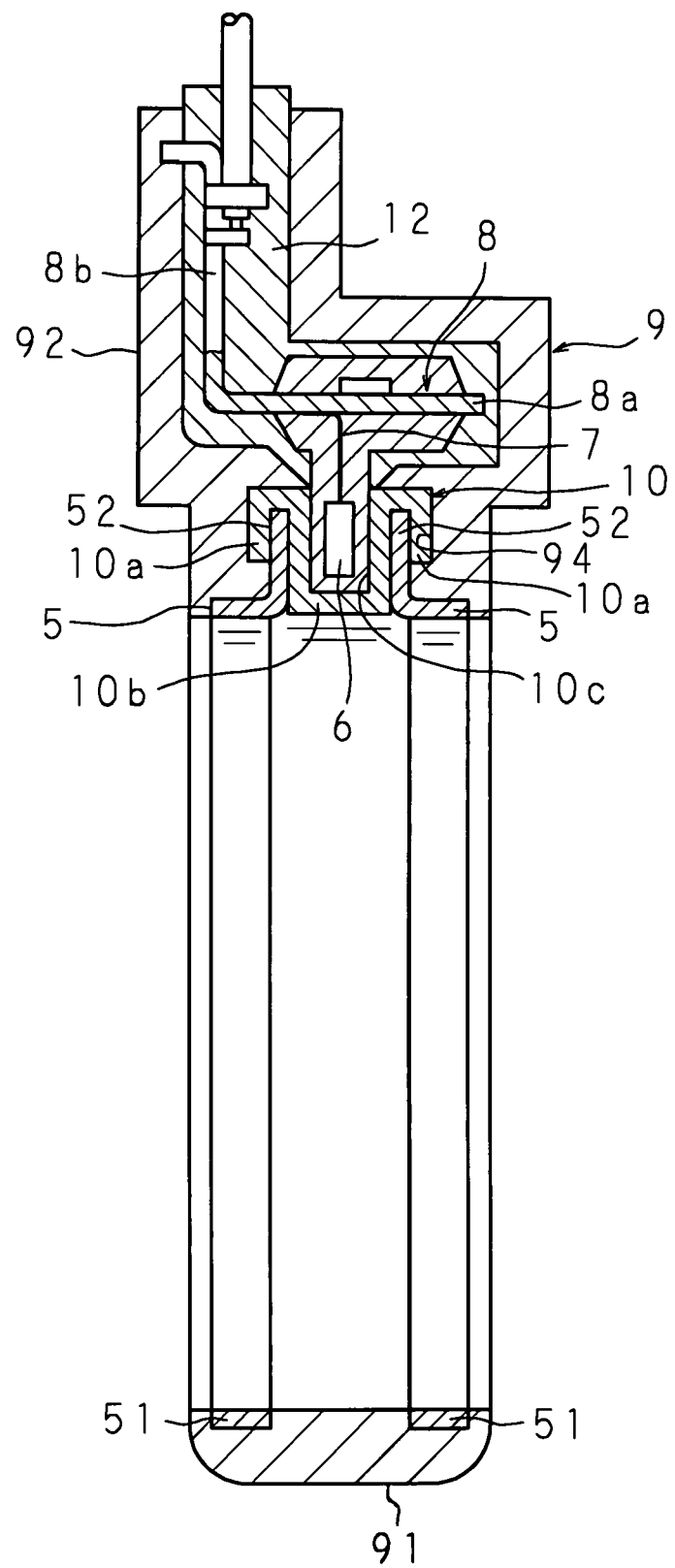
FIG. 2 is a sectional view showing a configuration of a torque detecting apparatus according to the present invention.
Figure 3:
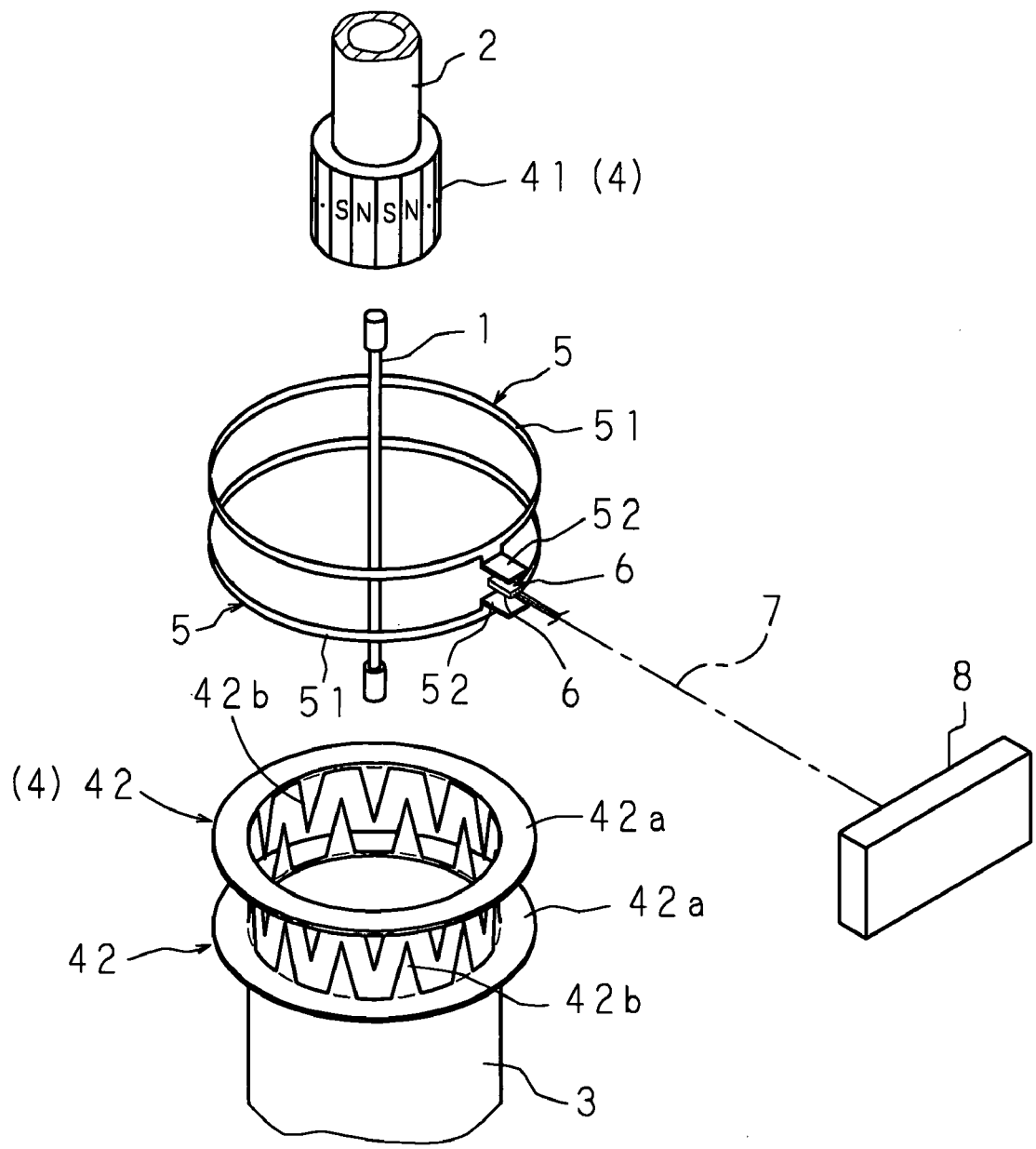
FIG. 3 is a schematic broken perspective view of a torque detecting apparatus according to the present invention.
Figure 4:
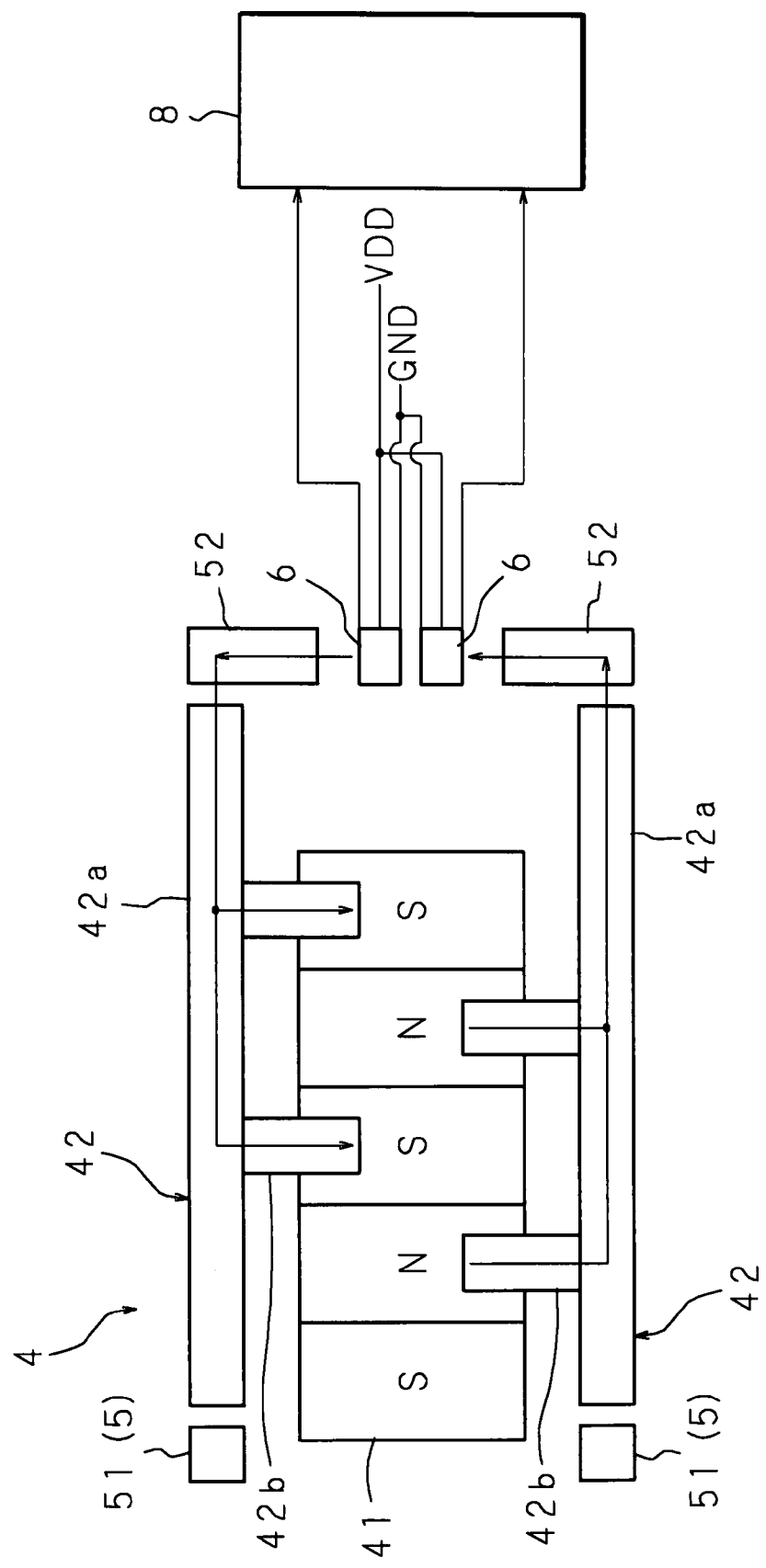
FIG. 4 is a illustrating view of a magnetic circuit produced in case of rotation of a rotating body in one direction.
Figure 5:
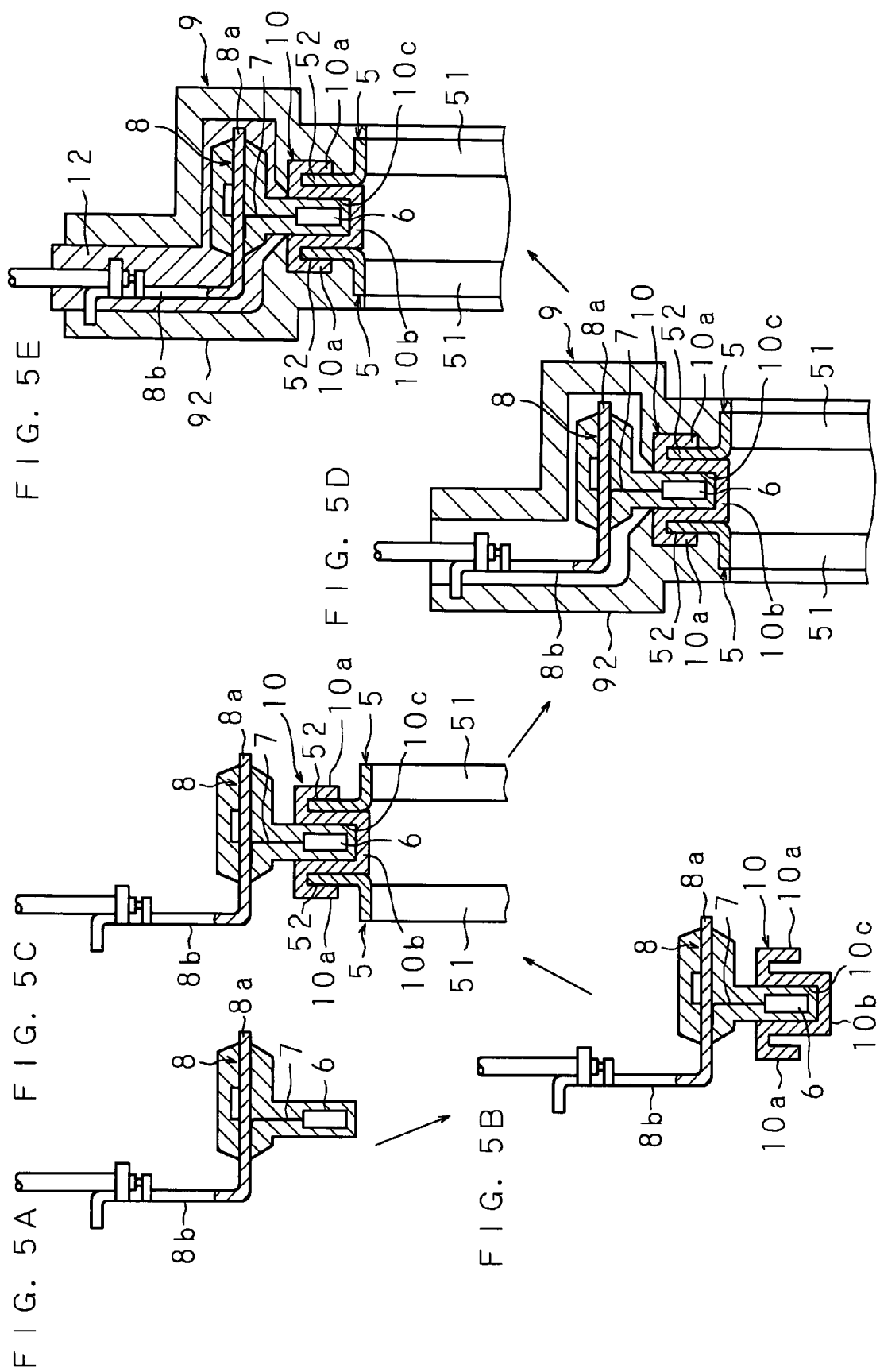
FIGS. 5A to 5E are illustrating views showing a manufacturing process of a torque detecting apparatus according to the present invention.

Hereinafter, the present invention is described in detail based on the drawings illustrating embodiments thereof. FIG. 2 is a sectional view showing a configuration of a torque detecting apparatus according to the present invention. FIG. 3 is a schematic broken perspective view of a torque detecting apparatus according to the present invention. FIG. 4 is an illustrating view of a magnetic circuit produced in case of rotation of a rotating body in one direction.

A torque detecting apparatus comprises two magnetism collecting rings 5, 5 for collecting a magnetic flux in a magnetic circuit forming member 4, the rings enclosing the magnetic circuit forming member 4 which a first rotating body 2 and a second rotating body 3 have, the bodies being concentrically connected to each other via a torsion bar 1, and the rings being disposed separately from each other in a rotation axis direction of rotating bodies 2, 3. The apparatus further comprises a magnetism sensitive device 6 for detecting torque exerted in the first rotating body 2 based on magnetism of the magnetic flux collected respectively by the magnetism collecting ring 5, 5, a detecting circuit board 8 connected to the magnetism sensitive device 6 via leads 7, and a casing 9 accommodating the magnetism collecting rings 5, 5 and the detecting circuit board 8. Here, the magnetic circuit forming member 4 consists of a plurality of permanent magnets 41 fixed on an outer circumference of the first rotating body 2, and two magnetic rings 42, 42 fixed to an outer circumference of the second rotating body with surrounding the permanent magnet 41.

The permanent magnet 41 has a cylindrical shape wherein, in a circumferential direction thereof, a plurality of N-poles and S-poles are formed one after the other, that is, alternately magnetized. It fits on the outer circumference of the first rotating body 2 to be fixed.

The magnetic rings 42, 42 have two ring plates 42a, 42a opposing each other, in the rotation axis direction of the second rotating body 3, being separated from each other. They also have a plurality of comb teeth 42b, 42b which extend from an inner circumference of each ring plate 42a toward each other. They are configured to allow a magnetic flux between the magnetic rings 42, 42 to vary by relative rotation thereof with respect to the permanent magnet 41. The comb teeth 42b, 42b are disposed one after the other in a circumferential direction at a constant interval. The magnetic ring 42, 42 are molded with synthetic resin to form a molded body in the state where the comb teeth 42b, 42b are disposed one after the other and intermeshing alternately.

The magnetism collecting rings 5, 5 have cylindrical portions 51, 51 disposed away from each other in an axial direction thereof They also have protruding pieces 52, 52 each of which is extending at a site of a circumference of corresponding cylindrical portion 51 radially outwardly such that the magnetism sensitive device 6 is disposed between the protruding pieces 52, 52, having a cylindrical shape. They are configured to allow magnetic flux to concentrate in the protruding pieces 52, 52. Moreover, the magnetism collecting rings 5, 5 are formed by a magnetic plate such as iron and steel plates. The protruding rings 52, 52 are inserted into a regulating body 10 to be fitted thereon.

This regulating body 10 includes two inserting recesses 10a, 10a into which the protruding pieces 52, 52 are inserted respectively, each recess having a prismatic shape. It also has a connecting part 10b connecting inner edges of openings of the inserting recesses 10a, 10a to each other. It also has a holding part 10c holding the magnetism sensitive device 6 between the inserting recesses 10a, 10a. They are integrally molded with a synthetic resin material with magnetism permeability.

The magnetism sensitive device 6 consists of such as a Hall element in which an electrical property (resistance) varies according to action of a magnetic field. It is configured to vary a detected signal corresponding to magnetism change between the protruding pieces 52, 52 of the magnetism collecting rings 5, 5. The detected signal is put into a controller formed of a microprocessor. The magnetism sensitive device 6 thus configured is molded with the synthetic resin material having magnetism permeability to be a molded part with leads 7 and a lead portion of the detecting circuit board 8. It is in the state where it is suspended by the leads 7 from the circuit bard. Here, the magnetism sensitive device 6 may such as a magnetoresistance effect device (an MR device) and any device in which the electric property (resistance) varies by action of the magnetic field as well as a Hall element, and it is not limited to the Hall element.

The detecting circuit board 8 has an L-shape. Its one portion 8a is molded with the magnetism sensitive device 6. Its other portion 8b is mounted in the casing 9 using bolts.

The casing 9 includes a cylindrical portion 91 having a through hole corresponding to inner circumferences of the magnetism collecting rings 5, 5. It also includes a prismatic portion 92 radially extended from an outer circumference of the cylindrical portion 91, the prismatic portion having a bottom. It also includes a flange 93 protruding to extend along with an outer circumference of the prismatic portion 92. It consists of a molded body molded with the regulating body 10 using molten synthetic resin. The cylindrical portion 91 communicates with inside of the prismatic portion 92 through an orifice 94 serving as a bore. The magnetism collecting rings 5, 5 fit inside of the cylindrical portion 91 to be fixed. The protruding pieces 52, 52 of the magnetism collecting rings 5, 5 and the magnetism sensitive device 6 are disposed at the orifice 94. Also, the detecting circuit board 8 mounts inside of the prismatic portion 92.

FIGS. 5A to 5E are illustrating views showing a manufacturing process of the torque detecting apparatus. Also referring to FIG. 2, the torque detecting apparatus configured as above is manufactured in following steps.

(1) Referring to FIG. 5A, the magnetism sensitive device 6 connected to the one portion 8a of the detecting circuit board 8 via leads 7, the leads 7 and the one portion 8a are accommodated in a cavity of a molding die. The cavity is filled with a molten synthetic resin material such as epoxy resin to mold a molded part to be manufactured.

(2) Referring to FIG. 5B, the magnetism sensitive device 6 of the molded part fits into a holding part 10c of the regulating body 10 to be held. The molded part is formed into a unit with the regulating body 10.

(3) Referring to FIG. 5C, the two magnetism collecting rings and the unit are accommodated in a cavity of a molding die. The protruding pieces 52, 52 of the magnetism collecting rings 5, 5 are inserted respectively into the inserting recesses 10a, 10a of the regulating body 10. Thereby the regulating body 10 holds the protruding pieces 52, 52. This regulating body 10 regulates a position of the magnetism sensitive device 6 relative to the protruding pieces 52, 52 and also regulates a distance between the protruding pieces 52, 52 at a desired value in length.

(4) Referring to FIG. 5D, the casing 9 is molded by filling the cavity with a molten synthetic resin material such as polybutyleneterephthalate. The regulating body 10 is integrally formed with the magnetism collecting rings 5, 5 by molding the regulating body 10 and the magnetism collecting rings 5, 5 integrally. Here, the holding part 10c of the regulating body 10 holds the magnetism sensitive device 6. The regulating body 10 holds the protruding pieces 52, 52 to allow them to insert thereinto. Thereby each of the magnetism collecting rings 5, 5 is prevented from a positional deviation to the regulating body 10, that is a positional deviation to the magnetism sensitive device 6. Here, there is provided a space around the detecting circuit board 8.

(5) Referring to FIG. 5E, a cover layer 12 covers the detecting circuit board 8 by filling the space around the detecting circuit board 8 with a molten synthetic resin material such as co-polymerized polyesters.

As described above, the magnetism sensitive device 6 is held in the holding part 10c of the regulating body 10 which has the two inserting recesses 10a, 10a and the holding part 10c. The protruding pieces 52, 52 of the magnetism collecting rings 5, 5 are held in the inserting recesses 10a, 10a to be inserted. The molding of the regulating body 10 integrally with the magnetism collecting rings 5, 5 forms the casing 9. Since the torque detecting apparatus is thus manufactured, the magnetism sensitive device 6 can be prevented from the positional deviation to the protruding pieces 52, 52 due to a molding pressure of the molten synthetic resin material. Also the protruding pieces 52, 52 can be prevented from a distance variation therebetween. Thereby detecting properties can be stabilized. Moreover, since the regulating body 10 and the magnetism collecting rings 5, 5 are molded simultaneously, the molding process is simple.

Here in the embodiment illustrated above, the regulating body 10 is made of synthetic resin. The regulating body 10 may be made of non-magnetic metals such as aluminum, and a material and shape thereof are not limited specifically.

In addition, a performing order of the steps described in (4) and (5) is reversible.

Figure 6:
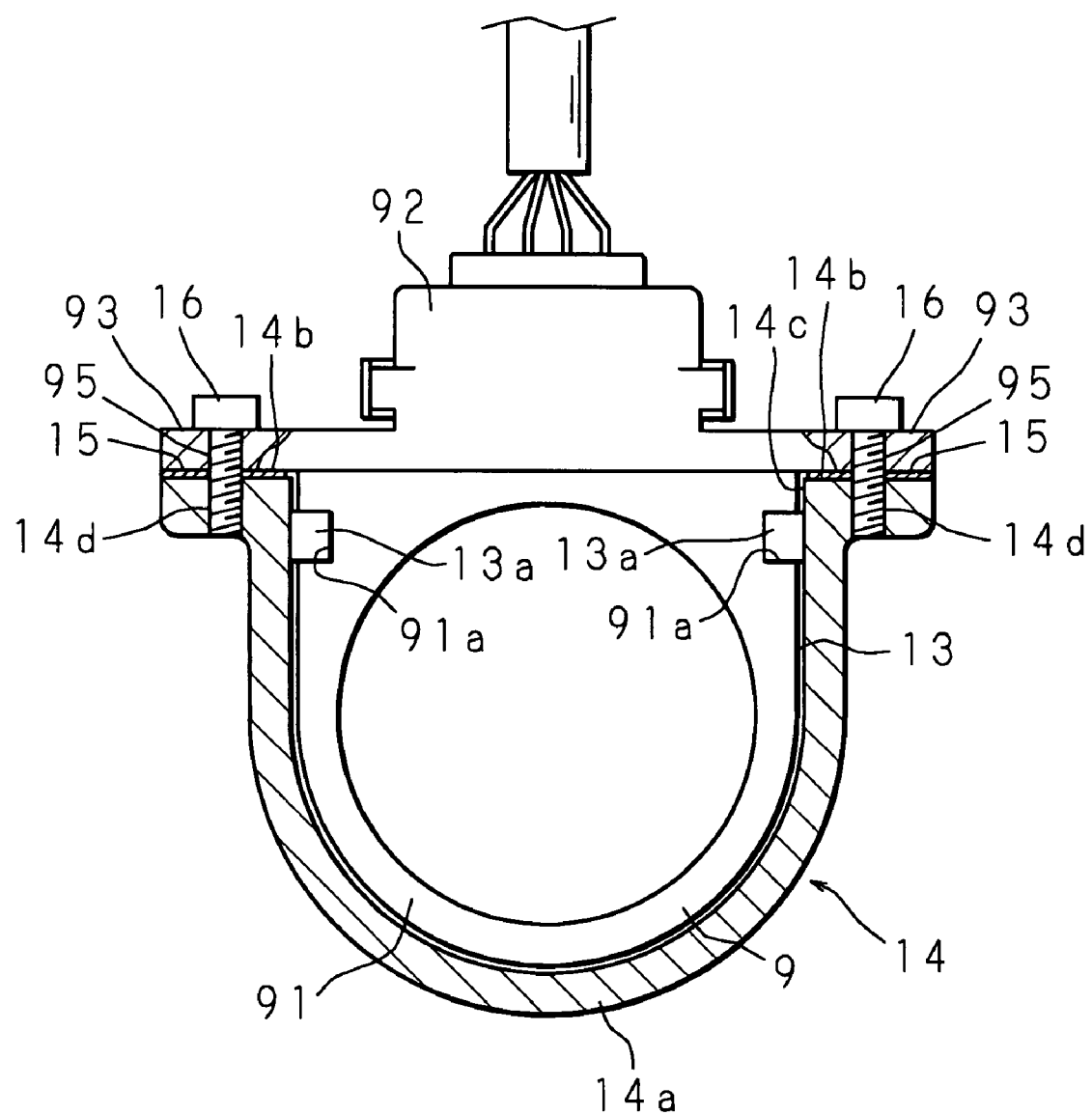
FIG. 6 is a sectional view showing another embodiment of a torque detecting apparatus according to the present invention.
Figure 7:
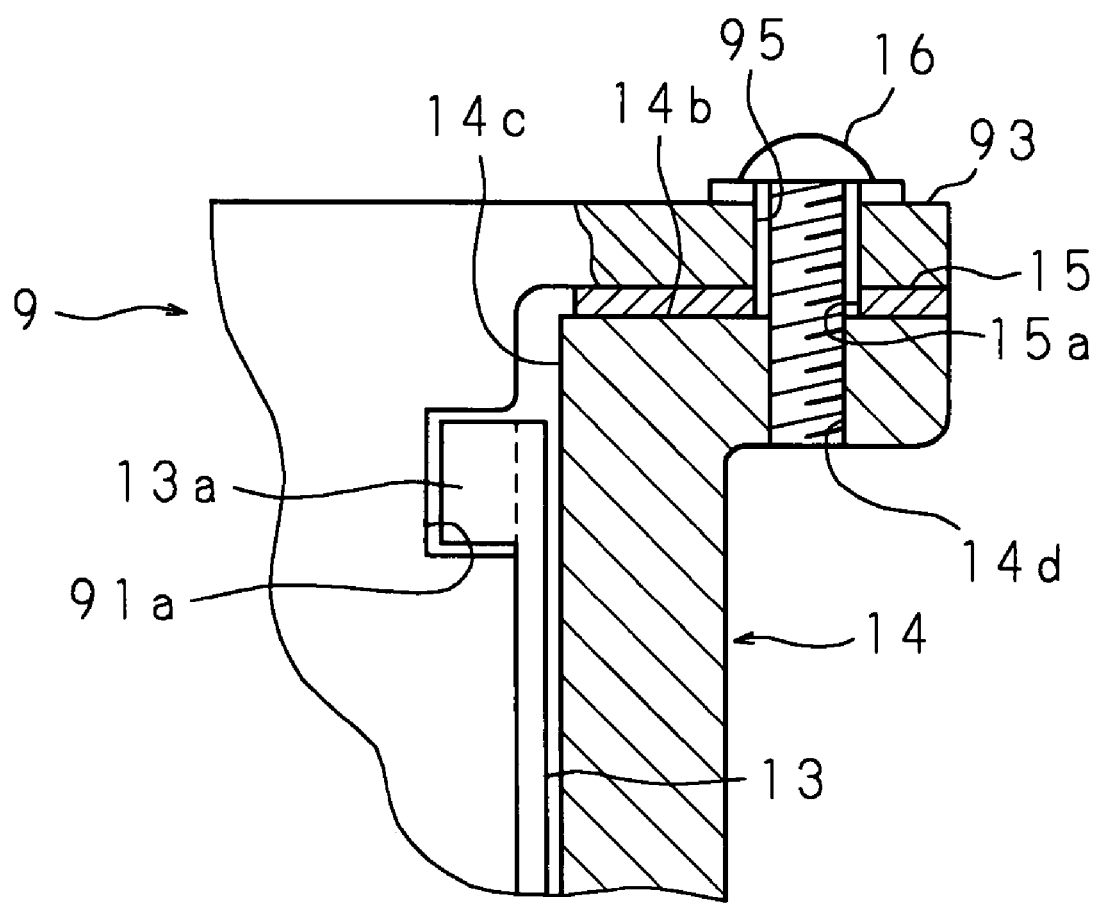
FIG. 7 is an enlarged sectional view of a particular portion of a torque detecting apparatus according to the present invention.
Figure 8:
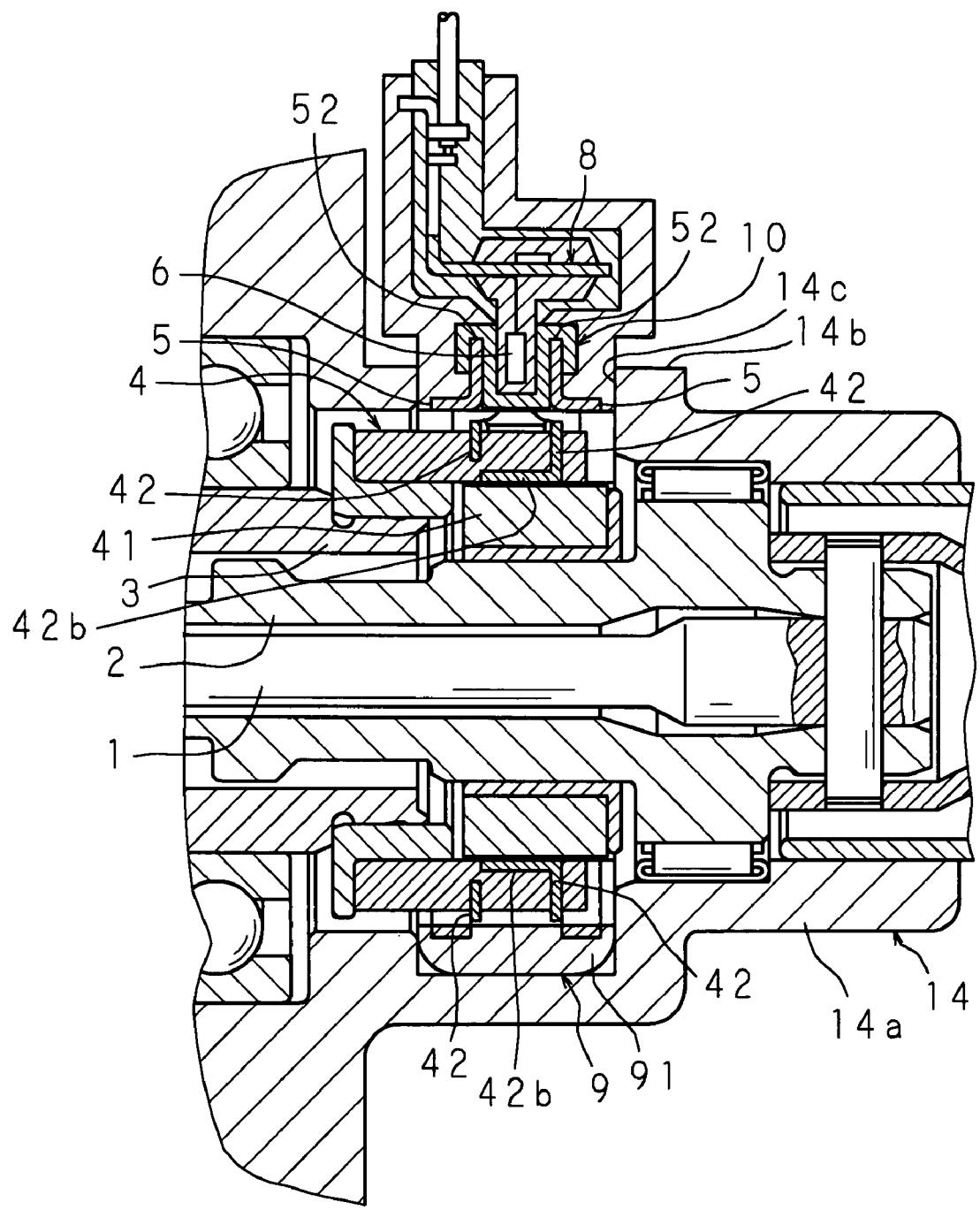
FIG. 8 is a sectional view showing a state where a substantial body includes a torque detecting apparatus according to the present invention.

FIG. 6 is a sectional view showing another embodiment of the torque detecting apparatus according to the present invention. FIG. 7 is an enlarged sectional view of a particular portion. FIG. 8 is a sectional view showing a state where a substantial body 14 includes the torque detecting apparatus. In this embodiment, the torque detecting apparatus comprises a magnetism shielding plate 13 which covers an outer circumference of the cylindrical portion 91 of the casing 9 having the cylindrical portion 91 and the flange 93. It also comprises an anti-vibrational body 15 by which the casing 9 is prevented from vibration thereof to a substantial body 14 suitable for mounting the casing 9.

The magnetism shielding plate 13 has a substantially U-shape corresponding to an outer surface of the casing 9, and is formed from a flexible non-magnetic material such as a silicon steel plate. Both ends of the magnetism shielding plate 13 respectively have engaging pieces 13a protruding therefrom, the pieces engaging by caulking respectively with two recesses 91a formed on the cylindrical portion 91.

The substantial body 14 consists of a housing which has cylindrical portion 14a enclosing the magnetic circuit forming member 4. The housing also has a mounting seat 14b for mounting the casing 9 and a through hole 14c, a sectional view of which is a rectangular, penetrating the mounting seat 14b for disposing the magnetism collecting rings 5, 5 and the cylindrical portion 91 inside of the cylindrical portion 14a. The mounting seat 14b has two screw holes 14d, 14d.

The anti-vibrational body 15 is for preventing vibration of the substantial body 14 from transmitting to the casing 9 between the mounting seat 14b and flange 93 and fills between the mounting seat 14b and flange 93. It is an annular sheet made of a material capable of sealing and preventing vibration from transmitting such as urethane rubber with low spring constant (high elasticity), butyl rubber with excellent shock absorbability and synthetic resin adhesives with viscosity. In addition, the anti-vibrational body 15 has communicating holes 15a, 15a corresponding to the screw holes 14d, 14d. Bolts 16, 16 are screwed respectively into the screw holes 14d, 14d to be fixed, being inserted respectively through each of holes 95, 95 provided in the flange 93 corresponding to the screw holes 14d, 14d and each of the communicating holes 15a, 15a. Thereby the anti-vibrational body 15 is pinched to be fixed.

In this embodiment, since the anti-vibrational body 15 has abilities of sealing and preventing vibration from transmitting, the magnetism collecting rings 5, 5 can be protected from moisture. Further, in case that external vibration is transmitted to the substantial body 14 supporting the casing 9, the anti-vibrational body 15 can prevent the vibration of the substantial body 14 from transmitting to the casing 9. Since the vibration can be thus prevented from transmitting to the casing 9 from the substantial body 14, the magnetism shielding plate 13 mounted outside of the casing 9 can be prevented from clicking against the casing 9. This causes reduction of noise from the magnetism shielding plate 13.

Since otherwise configurations and operations are same as in the embodiment represented in FIGS. 2 to 4, same parts have corresponding reference numerals, and illustration thereof in detail illustration of operations and effect are omitted.

Figure 9:
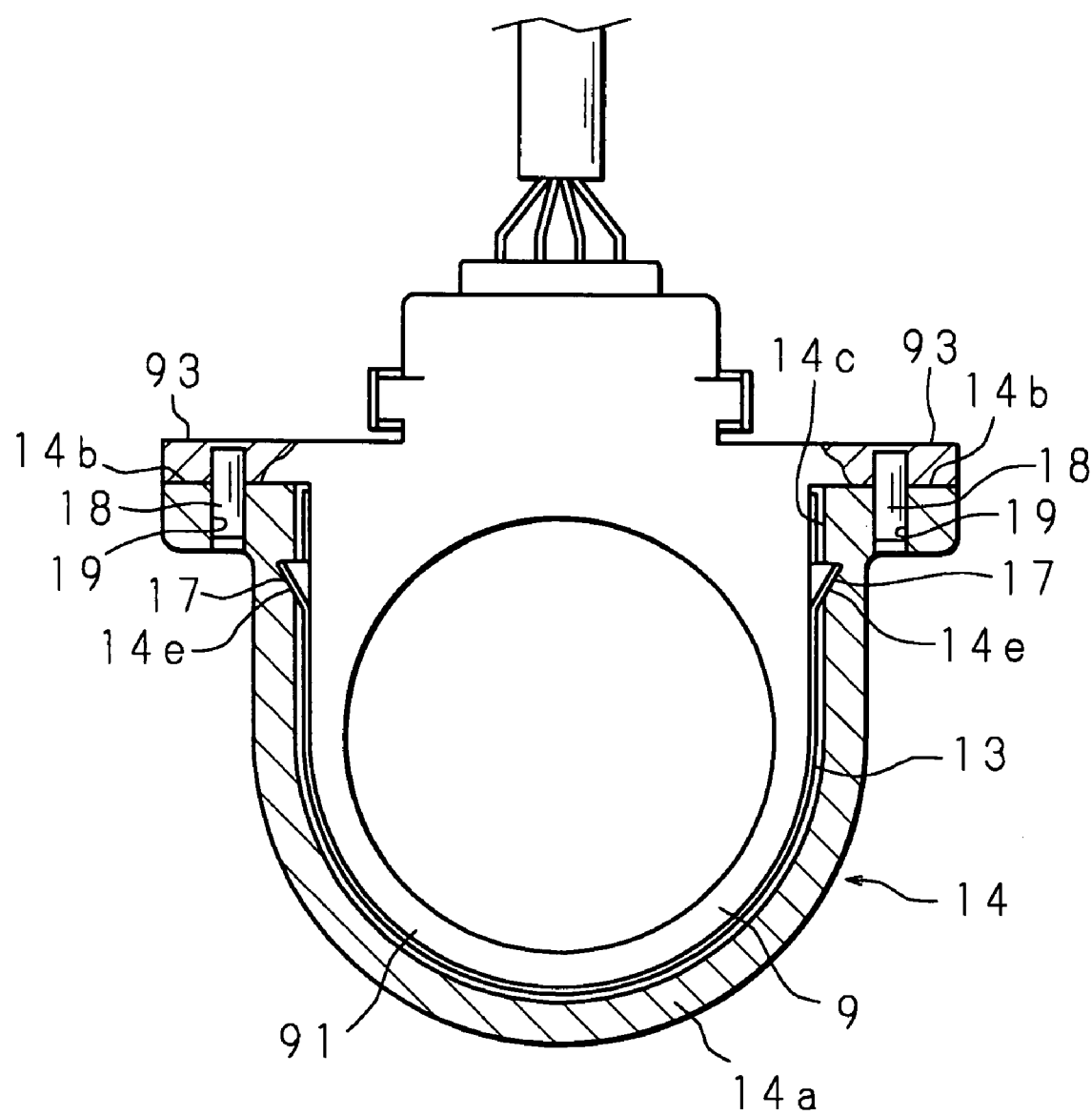
FIG. 9 is a sectional view showing another embodiment of a torque detecting apparatus according to the present invention.

FIG. 9 is a sectional view showing another embodiment of the torque detecting apparatus according to the present invention. In this embodiment, the torque detecting apparatus is mounted on the cylindrical portion 91 of the casing 9. Engagement claws 17, 17 are provided in the magnetism shielding plate 13 covering the outer circumference of the cylindrical portion 91. Engagement recesses 14e, 14e corresponding to the engagement claws 17, 17 are provided on the through hole 14c of the substantial body 14. The casing 9 is attachable onto the substantial body 14 without any bolts.

A figure of the cylindrical portion 91 has substantially a U-shape. The magnetism shielding plate 13 has substantially a U-shape corresponding to the figure of the cylindrical portion 91. Each of the engaging pieces shown in FIG. 6 and each of the engagement claws 17, 17 is provide at respective two ends of the magnetism shielding plate 13. The engagement claws 17, 17 are resilient and formed by cutting out to make tabs and then bending the tabs thus made. When the cylindrical portion 91 inserts into the through hole 14c, the engagement claws 17, 17 come into contact with an inside of the through hole 14c to bend resiliently, and engage with the engagement recesses 14e, 14e by resiliency thereof.

The engagement recesses 14e, 14e engaging with the engagement claws 17, 17 in the case of inserting the cylindrical portion 91 into the through hole 14c are respectively on opposing inner surfaces of the through hole 14c.

In addition, the mounting seat 14b of the flange 93 has positioning projections 18, 18 which space from each other and are parallel to each other. It also has positioning apertures 19, 19 corresponding to the positioning projections 18, 18.

In this embodiment, since, in the case of inserting the cylindrical portion 91 of the casing 9 into the through hole 14c of the substantial body 14, the engagement claws 17, 17 engage with the engagement recesses 14e, 14e, the casing 9 is prevented from falling through. Accordingly, assembling performance can be improved, for the torque detecting apparatus can mount on the substantial body 14 only by inserting operation without any bolts. The mounting can be carried out at an appropriate posture or position without any positional deviation, for a mounting position can precisely be set by inserting the positioning projections 18 into the positioning recesses 19 at this mounting operation.

Since otherwise configurations and operations are same as in the embodiments represented in FIGS. 2 to 8, same parts have corresponding reference numerals, and illustration thereof in detail and illustration of operations and effect are omitted.

Here, the configuration in the embodiment shown in FIG. 9 includes the magnetism shielding plate 13. Otherwise in the case without the magnetism shielding plate 13, the engagement claws can be provided on the cylindrical portion 91 of the casing 9. In the embodiment shown in FIG. 9, the positioning projections 18 are made from pins. Otherwise these positioning projection may be formed integrally with the flange 93.

As this invention may be embodied in several forms without departing from the spirit of essential characteristics thereof, the present embodiments are therefore illustrative and not restrictive, since the scope of the invention is defined by the appended claims rather than by description preceding them, and all changes that fall within metes and bounds of the claims, or equivalence of such metes and bounds thereof are therefore intended to be embraced by the claims.

What is claimed is: *

1. A torque detecting apparatus comprising:
   two magnetism collecting rings, for concentrating a magnetic flux passing through a magnetic circuit forming member, including:
   cylindrical portions enclosing the magnetic circuit forming member provided on a rotating body to which torque is exerted;
   protruding pieces protruding from parts of the cylindrical portions in an radially outward direction of the cylindrical portions;
   a magnetism sensitive device, disposed between the protruding pieces; and
   a casing accommodating the magnetism collecting rings and the magnetism sensitive device, with the magnetism collecting rings being fixed with the casing,
   wherein the torque exerted on the rotating body is detected based on magnetism sensed by the magnetism sensitive device,
   wherein the torque detecting apparatus further comprises a regulating body for regulating relative locations between the magnetism sensitive device and the respective protruding pieces,
   wherein said casing includes a molded body molded with said regulating body using molten synthetic resin,
   wherein the regulating body has two inserting recesses into which the protruding pieces insert respectively,
   wherein the magnetism sensitive device is connected to a circuit board via leads and is molded with the circuit board and the leads by synthetic resin to provide a formed body, and
   wherein the formed body fits between the inserting recesses.

2. A torque detecting apparatus according to claim 1, wherein the magnetic circuit forming member includes:
   two magnetic rings; and
   a magnet with a cylindrical shape,
   wherein each of the two magnetic rings includes:
   a ring plate portion spaced from the other of the two magnetic rings to oppose the other in a axial direction of the rotating body; and a plurality of comb teeth extending therefore toward the other, and wherein the magnet has a plurality of N-poles and S-poles in a circumferential direction at a constant pitch.

3. A torque detecting apparatus according to claim 2, wherein the plurality of the comb teeth belonging to each ring plate are arranged at a constant distance, and the constant distance is identical with the constant pitch with respect to an angular distance around an axis of the rotating body.

4. A torque detecting apparatus according to claim 1, wherein the regulating body is made of a magneto-permeating material.

5. A torque detecting apparatus according to claim 4, wherein the magneto-permeating material is a synthetic resin material.

6. A manufacturing method for a torque detecting apparatus according to claim 1, the method including steps of:
   fitting the magnetism sensitive device between the inserting recesses of the regulating body;
   inserting the protruding pieces of the two magnetism collecting rings into the respective inserting recesses; and
   molding the two magnetism collecting rings and regulating body with a synthetic resin material.

7. A manufacturing method according to claim 6, wherein the torque detecting apparatus further includes
   molding the magnetism sensitive device and the circuit board integrally to form a molded part having them; and
   fitting the molded part between the inserting recesses.

8. A manufacturing method according to claim 7, wherein the step of molding includes steps of:
   forming a casing surrounding the molded part, two magnetism collecting rings and regulating body by molding; and
   covering the molded part in the casing with synthetic resin.

9. A manufacturing method according to claim 6, wherein the step of molding includes steps of:
   forming a casing surrounding the two magnetism collecting rings and regulating body by molding; and
   filling the casing with synthetic resin.

* * * * *